Patented Apr. 7, 1953　　　　　　　　　　　　　　　　　　　　　2,634,204

UNITED STATES PATENT OFFICE 2,634,204

RECOVERY OF MANGANESE

Robert A. Schoenlaub, Cleveland, Ohio, assignor to Sylvester & Company, Cleveland, Ohio, a corporation of Ohio No Drawing. Application January 25, 1951, Serial No. 207,849

5 Claims. (Cl. 75—80)

This invention relates to a process for the recovery of manganese from low silica ores.

Manganese is a difficult metal to obtain. It has a greater affinity for the various constituents in an ore or slag than such constituents have for each other. It resists reduction to such an extent that undesirable metals are reduced before or simultaneously with the manganese. It is retained tenaciously by slags and if higher temperatures are used to free the manganese volatilization losses become excessive.

In addition to these difficulties it is sometimes found in environments which create special problems. For example, if a magnetic concentrate from an open hearth slag produced, for example, by the process disclosed in my co-pending application, Serial No. 86,603, now Patent No. 2,539,485, is freed of all the associated silicate the composition is about as follows:

| | |
|---|---|
| CaO | 1.8 |
| $Al_2O_3$ | 9.6 |
| $Fe_2O_3$ | 44.8 |
| MnO | 28.4 |
| MgO | 15.0 |

If this is reduced, a mixture of metal and refractory dross is obtained. This dross consists of periclase (MgO) and spinel ($MgO.Al_2O_3$) which is quite refractory and mechanically holds up the metal.

There are not many fluxes which are operable upon periclase and spinel mixtures. Basic fluxes such as alkali or lime are ineffective; fluorides are also ineffective. Acidic fluxes such as silica will reduce the melting temperatures, but result in disproportionate manganese losses.

It is an object of the present invention to provide a process whereby manganese may be removed from such refractory mixtures.

Other objects of the invention will appear as the description proceeds.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be used.

Broadly stated this invention comprises the process of reducing substantially refractory manganese containing ores which have a silica content of not more than about 6% and which may contain also a substantial amount of magnesia, which comprises first adjusting the calcium, silicon and aluminum content of the ore to provide the theoretical amounts of these elements necessary to form in a smelt of the ore a dicalcium silicate and a calcium aluminate in the proportions of from one to four parts of calcium aluminate per part of dicalcium silicate, and then smelting at between 2600° F. and 3200° F.

If spinel is reacted to monocalcium aluminate ($CaO.Al_2O_3$) or to pentacalcium trialuminate ($5CaO.3Al_2O_3$) and dicalcium silicate provided in amounts of between ¼ to 1 part for each part of calcium aluminate the reduction can be easily made without using excessive temperature nor losing excessive manganese. Tricalcium aluminate may also be used but not as well. Best results are obtained with pentacalcium trialuminate.

This composition may be obtained as follows: To each part of alumina present in the ore, fluxes, or metallurgical additions; between .67 and .17 part of silica are provided. This silica may be present in the concentrate, or ore, it may be added as a flux, or it may be added as a reducer such as ferrosilicon, manganese silicide, etc. For each part of alumina by weight between ½ and 1½ parts of CaO are provided and for each part of silica by weight 1.8 parts of CaO by weight are provided. Chemically the following equations are utilized:

1. 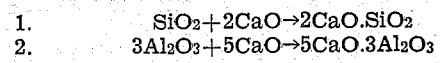　　$SiO_2 + 2CaO \rightarrow 2CaO.SiO_2$
2. 　　　$3Al_2O_3 + 5CaO \rightarrow 5CaO.3Al_2O_3$ Alternative to Reaction 2, Reaction 3 or combinations of Reactions 2 and 3 may be used.

3. 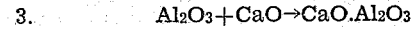　　$Al_2O_3 + CaO \rightarrow CaO.Al_2O_3$

Less preferably Reaction 4 may also be used in a similar manner.

4. 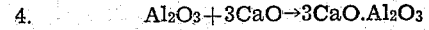　　$Al_2O_3 + 3CaO \rightarrow 3CaO.Al_2O_3$

The ratio of the aluminates to silicates by weight must be between 1:1 to 4:1.

The ores, concentrates, additions, coke, etc., after being thoroughly mixed, are then smelted in a suitable furnace at temperatures between about 2600° F. and about 3200° F. At the lower limit the slag has a tendency to become too viscous and drossy to release metal well and at the upper limit some manganese will be lost by volatilization. A temperature between 2800 and 2900° F. usually gives best results. With such a reduction step a spiegeleisen containing between 25 and 35% manganese is obtained.

It is often desirable to obtain ferromanganese and iron rather than spiegeleisen. This can be accomplished by adding just enough, or slightly less than enough, coke to reduce the iron and any phosphorus which may be present but not enough to reduce the manganese. The ore of concentrates are smelted in the usual manner except that a lower temperature is used and enough time is allowed for the slag and metal to reach equilibrium. A small amount of the iron will be in the manganese and of manganese in the iron. Higher temperatures make the separation of iron and manganese less complete. After the iron has been separated from the slag the final reduction of ferromanganese can be made, utilizing the compositions previously described.

The following are examples of my invention:

1. In making a manganese concentrate from an open hearth slag according to the process of my said co-pending application, approximately 10% of the dicalcium silicate gangue is left in the concentrate to supply a composition as follows:

|  | Percent | Molar Equivalents (M. E.) |
|---|---|---|
| CaO | 7.9 | .14 |
| Al₂O₃ | 8.7 | .087 |
| Fe₂O₃ | 40.2 | .25 |
| MnO | 25.4 | .358 |
| MgO | 13.4 | .335 |
| SiO₂ | 3.2 | .054 |
| P₂O₅ | .23 |  |

The additions are calculated as follows: To 100 parts of concentrates the CaO necessary for the SiO₂ and Al₂O₃ is as follows:

.087 × 5/3 = .145 M. E. CaO required for Al₂O₃
.054 × 2 = .108 M. E. CaO required for SiO₂

Total .253 M. E. CaO required
.14 M. E. CaO in concentrate

.113 M. E. CaO required as addition
6.3 part CaO required

This 6.3 parts of CaO plus 14.5 parts of carbon are added to the concentrate, and after mixing, the mixture smelted at 2900° F. The slag is separated and metal recovered. The slag comprises 39.5 parts, consisting of the following minerals: 42.4% of pentacalcium trialuminate, 23.5% of dicalcium silicate, and 34.0 parts of periclase. The ratio of calcium aluminate to dicalcium silicate is 1.8 to 1.

The metal will comprise about 48 parts containing about 55% Fe, 37% Mn and the remainder Si and C with about 2 phosphorus.

*Example 2.*—A concentrate similar to that used as the starting material in Example 1 was combined with CaO and 9 parts of carbon instead of 14 parts as previously described, and smelted at 2700° F. until most of the iron was free. This gave about 27 parts of iron containing about 2% manganese and .35 phosphorus with 4% carbon.

The slag was again smelted with about 5 parts of carbon at 2950° F. This gave about 20 parts of ferromanganese containing more than 80% manganese with practically no phosphorus.

Instead of using a concentrate like that employed as the starting material in the above examples, my process is applicable also, as indicated above, to the reduction of other or like minerals which have a silica content of not more than about 6%. If the starting material is low in or free of alumina, such material may be added to bring about the necessary balance as previously explained.

Other modes of applying the principle of the invention may be employed, change being made as regards the details described, provided the features stated in any of the following claims, or the equivalent of such, be employed.

I therefore particularly point out and distinctly claim as my invention:

1. The process of reducing substantially refractory manganese containing ores which have a silica content of not more than about 6%, which comprises first adjusting the calcium, silicon and aluminum content of the ore to provide the theoretical amounts of these elements necessary to form in a smelt of the ore a dicalcium silicate and a calcium aluminate in the proportions of from one to four parts of calcium aluminate per part of dicalcium silicate, and then smelting at between 2600° F. and 3200° F.

2. The process of reducing substantially refractory manganese containing ores which have a silica content of not more than about 6%, which comprises first adjusting the calcium, silicon and aluminum content of the ore to provide the theoretical amounts of these elements necessary to form in a smelt of the ore a dicalcium silicate and pentacalcium trialuminate in the proportions of from one to four parts of such calcium aluminate per part of dicalcium silicate, and then smelting at between 2600° F. and 3200° F.

3. The process of reducing substantially refractory manganese containing ores which have a silica content of not more than about 6% and which contain also a substantial amount of magnesia, which comprises first adjusting the calcium, silicon and aluminum content of the ore to provide the theoretical amounts of these elements necessary to form in a smelt of the ore a dicalcium silicate and a calcium aluminate in the proportions of from one to four parts of calcium aluminate per part of dicalcium silicate, and then smelting at between 2600° F. and 3200° F.

4. The process of reducing substantially refractory manganese containing ores which have a silica content of not more than about 6% and which contain also a substantial amount of magnesia, which comprises first adjusting the calcium, silicon and aluminum content of the ore to provide the theoretical amounts of these elements necessary to form in a smelt of the ore dicalcium silicate and pentacalcium trialuminate in the proportions of from one to four parts of such calcium aluminate per part of dicalcium silicate, and then smelting at between 2600° F. and 3200° F.

5. In a process of reducing manganese-containing ore, providing such an ore which contains not over about 6% of silica, adjusting its composition to give a content of an aluminate of calcium in proportion to dicalcium silicate as a ratio 1–4:1, and then smelting at 2600°–3200° F.

ROBERT A. SCHOENLAUB.

REFERENCES CITED

The following references are of record in the file of this patent:

UNITED STATES PATENTS

| Number | Name | Date |
|---|---|---|
| 2,265,866 | Royster | Dec. 9, 1941 |

FOREIGN PATENTS

| Number | Country | Date |
|---|---|---|
| 454,165 | Great Britain | Sept. 25, 1936 |